(12) United States Patent
Gerweck et al.

(10) Patent No.: US 11,995,078 B2
(45) Date of Patent: May 28, 2024

(54) QUERY INTAKE FOR LEGACY DATABASES

(71) Applicant: Atscale, Inc., San Mateo, CA (US)

(72) Inventors: Sarah Gerweck, San Mateo, CA (US); Rouzbeh Safaie, San Francisco, CA (US); Gaurav Nitin Shetti, San Mateo, CA (US)

(73) Assignee: AtScale, Inc., Boston, MA (US)

( * ) Notice: Subject to any disclaimer, the term of this patent is extended or adjusted under 35 U.S.C. 154(b) by 0 days.

(21) Appl. No.: 17/529,878

(22) Filed: Nov. 18, 2021

(65) Prior Publication Data

US 2022/0156263 A1    May 19, 2022

Related U.S. Application Data

(60) Provisional application No. 63/115,781, filed on Nov. 19, 2020.

(51) Int. Cl.
*G06F 16/2453*    (2019.01)
(52) U.S. Cl.
CPC .............. *G06F 16/24534* (2019.01)
(58) Field of Classification Search
CPC ............................. G06F 16/24534
See application file for complete search history.

(56) References Cited

U.S. PATENT DOCUMENTS

| | | | | |
|---|---|---|---|---|
| 2013/0097151 A1* | 4/2013 | Cushing | ............... | G06F 16/283 707/E17.014 |
| 2015/0074135 A1* | 3/2015 | Beavin | .............. | G06F 16/24534 707/759 |
| 2018/0218031 A1* | 8/2018 | Wong | ................. | G06F 16/2425 |

* cited by examiner

*Primary Examiner* — Richard L Bowen
*Assistant Examiner* — Aryan D Toughiry
(74) *Attorney, Agent, or Firm* — Armis IP Law, LLC (57) ABSTRACT

A query syntax analysis and postprocessing system and method receives a query request specifying values of a data type directed to a database without native support for the queried data type. A query engine or process for receiving a query request defined by a query syntax traverses the query request for a specification of an unsupported value or expression. In a large, distributed database environment, the query request may implicate multiple physical data stores, each having specific formats and recognized syntax. Values of unsupported or non-native types, or expressions that evaluate to an unsupported or non-native type, are identified and replaced with an expression that is recognized by the legacy database.

19 Claims, 6 Drawing Sheets

QUERY INTAKE FOR LEGACY DATABASES

RELATED APPLICATIONS

This patent application claims the benefit under 35 U.S.C. § 119(e) of U.S. Provisional Patent App. No. 63/115,781, filed Nov. 19, 2020, entitled "QUERY INTAKE FOR LEGACY DATABASES," incorporated herein by reference in entirety.

BACKGROUND

Electronic databases store vast amounts of data, and have been doing so for several decades ever since the cost of computer hardware came within reach for most businesses and consumers. While hardware and software follow improvement trends based on technological advance, the data so stored may not be feasible to translate or move to new storage devices or storage formats. Accordingly, so-called "legacy" databases exist which are accessible by older database management systems (DBMSs) which may not have as robust a query capability as more modern databases.

SUMMARY

A query syntax analysis and postprocessing system and method receives a query request specifying values of a data type directed to a database without native support for the queried data type. A query engine or process for receiving a query request defined by a query syntax traverses the query request for a specification of an unsupported value or expression. In a large, distributed database environment, the query request may implicate multiple physical data stores, each having specific formats and recognized syntax. Values of unsupported or non-native types, or expressions that evaluate to an unsupported or non-native type, are identified and replaced with an expression that is recognized by the legacy database.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

A query syntax analysis and postprocessing system and method receives a query request specifying Boolean values directed to a database that does not have native support for Boolean values. A query engine or process for receiving the query request, defined by a query syntax, traverses the query request for a specification of a Boolean value or expression that is unsupported. In a large, distributed database environment, the query request may implicate multiple physical data stores, each having specific formats and recognized syntax. Boolean values, or expressions that evaluate to a Boolean value, in an inappropriate position are identified and replaced with an expression that is recognized by the legacy or Boolean-unsupported database.

Legacy or older relational database management system (RDBMSs, or simply DBMS) often employ a syntax that supports Boolean values only in a filter context. Boolean expressions may not be recognized by the DBMS in a value context. Most often, a filter context occurs in an "AND", "OR" or "WHERE" clause that specifies a condition that must evaluate to a defined condition. More modern syntax interpretation allows for Boolean expressions in a value specification. However, a problem occurs when a query request specifies a Boolean value and one or more of the data repositories interrogated by the query request cannot handle the Boolean value.

Modern database usage typically includes software based queries issued from a user application in the form of query statements directed to the database. Often the query statements take a mnemonic form such as SQL (Structured Query Language) or similar command based syntax that is human readable and recognized by a database management system (DBMS) that accepts commands and returns query results. While SQL is a common query medium, variances in vendor implementations and the age of the DBMS may give rise to disparities. Older databases may retain a corresponding DBMS due to complexities and/or expense in porting the database to a newer repository. Accordingly, query requests emanating from a modern interface may include expressions that are unrecognized by the older DBMS to which they are directed.

More specifically, a query request may specify a syntax element such as a conditional expression or value having a data type that is unrecognized by the target DB (database). In particular, modern SQL dialects permit conditional selection directly in a field expression, formerly requiring only an absolute field name.

These so-called legacy systems do not properly support Boolean data types in value contexts, allowing their use only in conditional or filtering expressions. For example, a database might support the following expression:

SELECT Color WHERE Size>3

However, the same database might not support the following expression:

SELECT Size>3 WHERE item_id=13

These legacy systems differentiate between a filter context, where Boolean expressions are required, and a value context, where Boolean values are not permitted. This creates an issue for computer systems that abstract over many database types, as they may wish to operate using Boolean types directly. Configurations herein may also facilitate other type based mismatches, where a query request specifies a type not supported by the DBMS, or query interpreter, of the target DB.

The example configurations below depict a simulation of Boolean data types for queries directed to legacy databases or other queryable data storage systems that have concepts of filtering but that cannot natively represent Boolean data types directly. Context-insensitive transformation rules allow this to be done using local transformations only, making it suitable for a wider class of query optimizers than a transformation that requires full context sensitivity.

Figure 1:
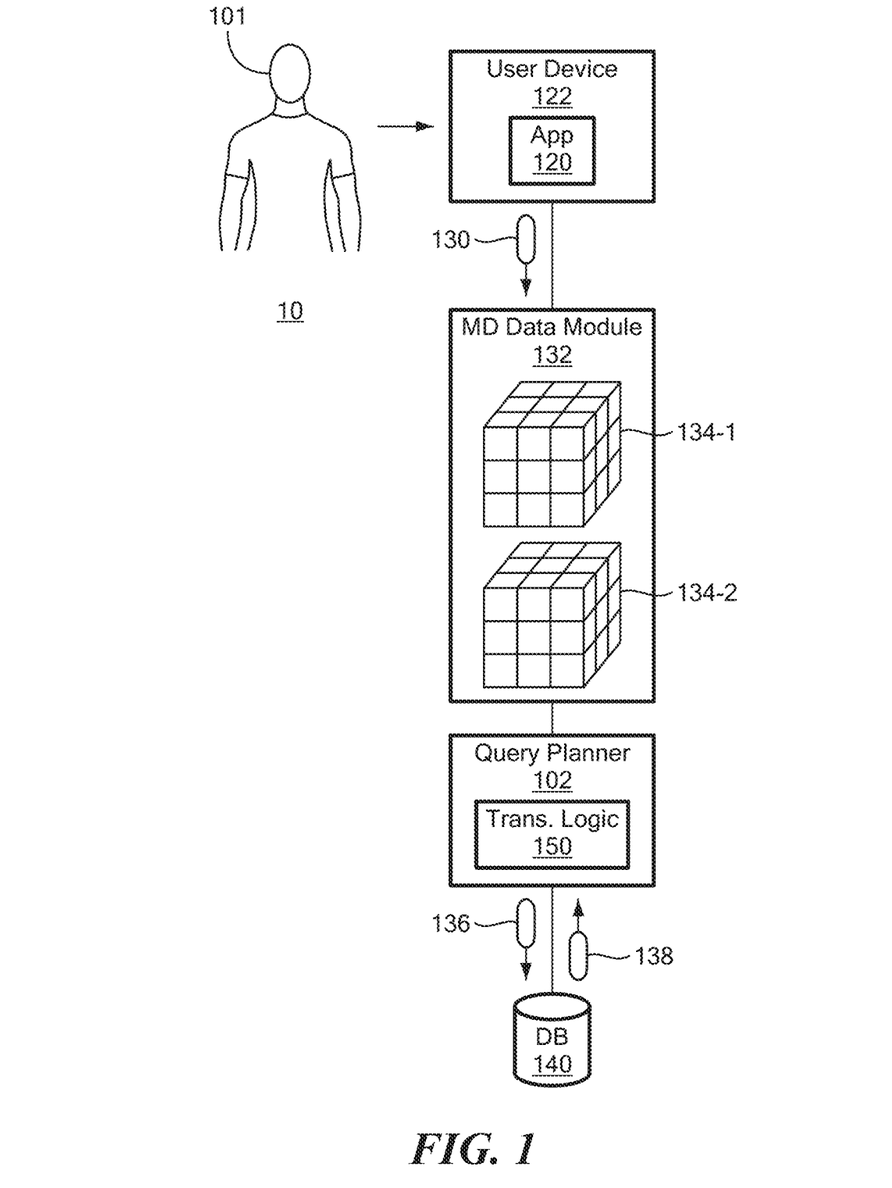
FIG. 1 is a context diagram of a database environment suitable for use with configurations herein.

FIG. 1 is a context diagram of a database environment suitable for use with configurations herein. Referring to FIG. 1, in a database environment 10, a user 101 launches an application (app) 120 on a computing device 122. The app 120 may be any suitable analysis, reporting or gathering application that invokes the database by generating and issuing (transmitting) query statements 130. The query statements 130 are typically SQL statements that reference metadata such as field names and values or comparisons that designate certain data items for retrieval.

In a robust database environment, the database takes the form of a multidimensional data model 132, and further organizes the metadata inro multidimensional units, or datacubes 134-1 . . . 134-2 (134 generally). Each datacube 134 generally includes a subset of all available dimensions in the DB 140, where each dimension defines a particular field. For example, a datacube 134-1 may be defined for sales and include dimensions for products, date and amount, while another datacube 134-2 may reference orders from particular vendors, for date and quantity, for example. Conventional tabular databases included tabular or "flat" files referencing only rows and columns. Computationally intensive "join" operations were needed to satisfy queries of multiple fields across the relevant tables. Each datacube 134, in contrast, is a virtual representation based on metadata, that arranges a subset of available fields needed for a query, e.g. sales and orders, but refers back to the same raw data e.g. product counts, so that data replication is not required.

Returning to FIG. 1, using a relevant datacube to address the query statement 130, a query planner 102 can identify the relevant fields in the database 140 based on the datacube. Recall that the actual database 140 is agnostic to the app 120 invoked by the user. The database 140 has a query syntax defining metadata and expressions recognized for querying the database. Accordingly, the query planner 102 has transformation logic 150 for comparing a conditional expression in the query statement 130 to a recognized query syntax of the database. According to configurations herein, the transformation logic 150 may determine that the conditional expression is not supported by the query syntax of the database 140, and generating a transformed query statement 136 including the conditional expression defining the supported type. The database 140 receives and processes the transformed query statement 136, and returns a query result 138 that satisfies the query statement 130. Typical usage expects a query statement 130 composed of field names and conditional statements, using an English-like mnemonic syntax such as SQL with a relational database. The most beneficial use is obtained when the target database 140 is a relational database absent a native Boolean type, as in older SQL databases. Alternatively, a query statement may target multiple databases, and issue a portion of the query request, or subquery, to each. In this case, one of the databases 140 may be an older DBMS, and it may not be apparent to the user 101 or the app 120 that a queried data type was unsupported.

Figure 2:
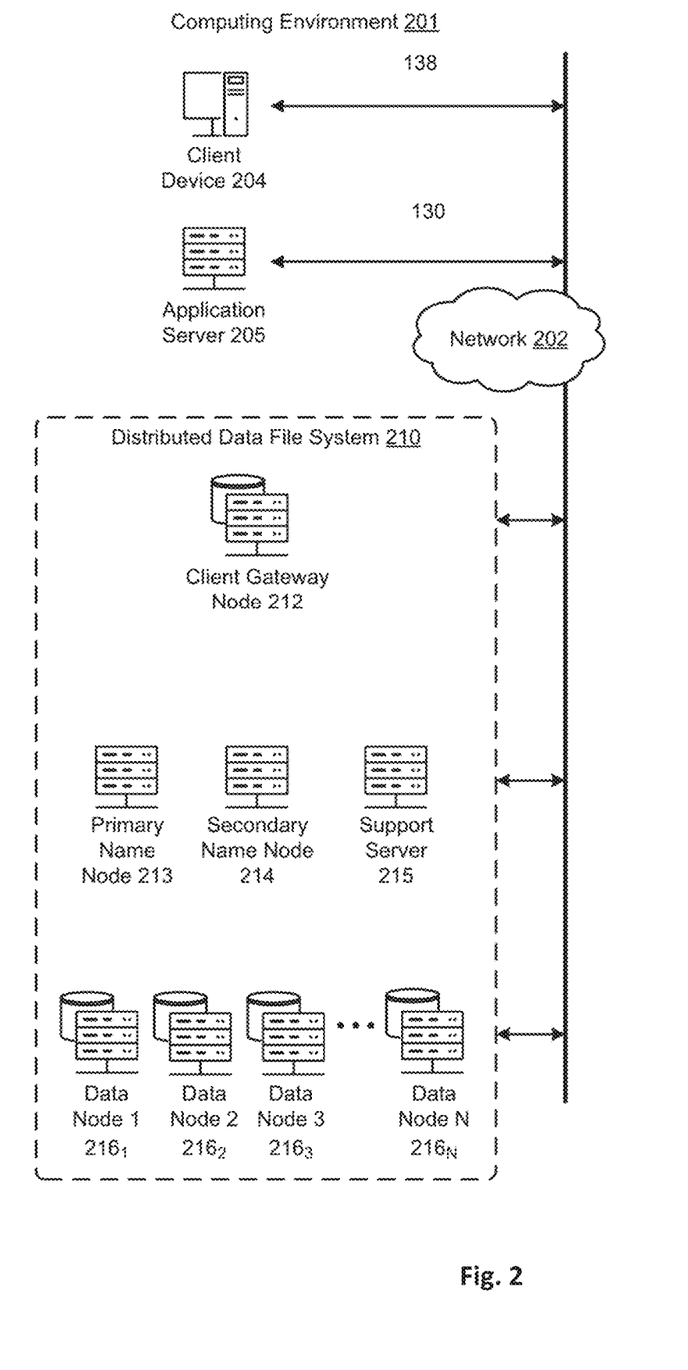
FIG. 2 is a physical file storage system suitable for supporting the database of FIG. 1.

FIG. 2 is a physical file storage system suitable for supporting the database of FIG. 1. Referring to FIGS. 1 and 2, the computing environment 10 comprises one or more instances of a client device 204 (e.g., a desktop computer), one or more instances of an application server 205, and one or more instances of a distributed data file system 210. The user application 120 and database 140 may comprise and/or operate in conjunction with a client device 204 and any number of physically distributed and networked storage entities, typically disk drives or SSD (solid state drive) devices. The aforementioned devices, servers, and systems can communicate through a network 202 (e.g., a wireless network, a wide area network (WAN), a local area network (LAN), the Internet, an intranet, a private network, etc.). More specifically, the distributed data file system 210 can be configurable to store and process large volumes of data (e.g., using an HDFS framework) and comprise one or more instances of a client gateway node 212, one or more instances of a primary name node 213, one or more instances of a secondary name node 214, one or more instances of a support server 215 (e.g., executing data analysis processes, etc.), and a plurality of data nodes 216 (e.g., data node 1 216-1, data node 2 216-.2, data node 3 216-3, to data node N 216-N). The distributed data file system 210 is configurable to store large files of data across multiple computing devices (e.g., the plurality of data nodes 216), rather than store all of the files on a single computing device with a large amount of storage capacity. To accommodate such distributed storage, the plurality of data nodes 216 can be configured with one or more rack-mounted servers coupled (e.g., using SATA or SAS interconnects) to multiple hard disk drives for storing the data. As an example, when a file is loaded into distributed data file system 210, it is replicated and partitioned into "blocks" of data, which are distributed and stored across the plurality of data nodes 216. The primary name node 213 is responsible for storage and management of metadata associated with the distributed data file system 210, such that, for example, the primary name node 213 can provide data location information for data processing operations. Further, other configurations, partitions, and architectures of the distributed data file system 210 shown in computing environment 201 are possible. For example, a single-node implementation may have all of the nodes (e.g., client gateway node 212, primary name node 213, the plurality of data nodes 216, etc.) reside on a single computing device. Also, a small cluster of two nodes may have a first computing device operate as a name node and a second computing device operate as a data node. Further, the distributed data file system 210 can represent any database management system.

Figure 3:
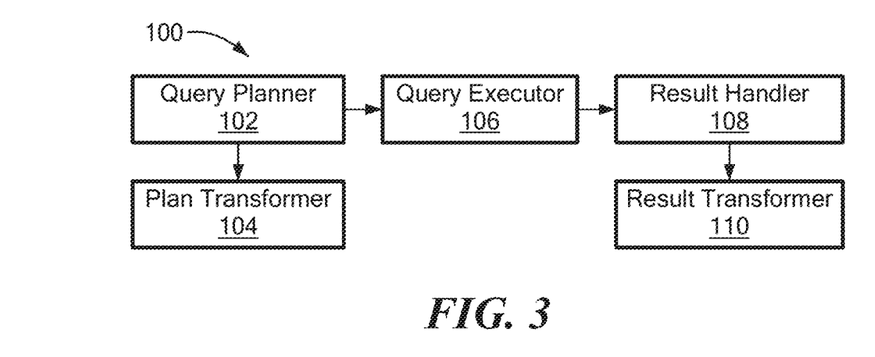
FIG. 3 is a block diagram of the query engine in the environment of FIG. 1.

FIG. 3 is a block diagram of the query planner 102 and query engine in the environment of FIG. 1. Referring to FIGS. 1-3, in a particular arrangement shown in FIG. 3, a query system 100 employs the query planner 102 that uses a tree-based representation of queries, and a query-plan transformer 104 that is responsible for adapting a query for a target database. The query plan transformer 104 is responsible for adapting a query to a specific database 140 from among multiple possible databases that may be invoked by the query request. Also includes are a query executor 106, a result handler 108 responsible receiving returned values and handling query results, and a result transformer 110 defined as a plugin to the result handler 108 that conforms the resulting data types, such as the simulated Boolean type disclosed herein. Other suitable arrangements for processing and transforming the query statement 130 into the transformed query statement 136 may also be achieved.

Figure 4:
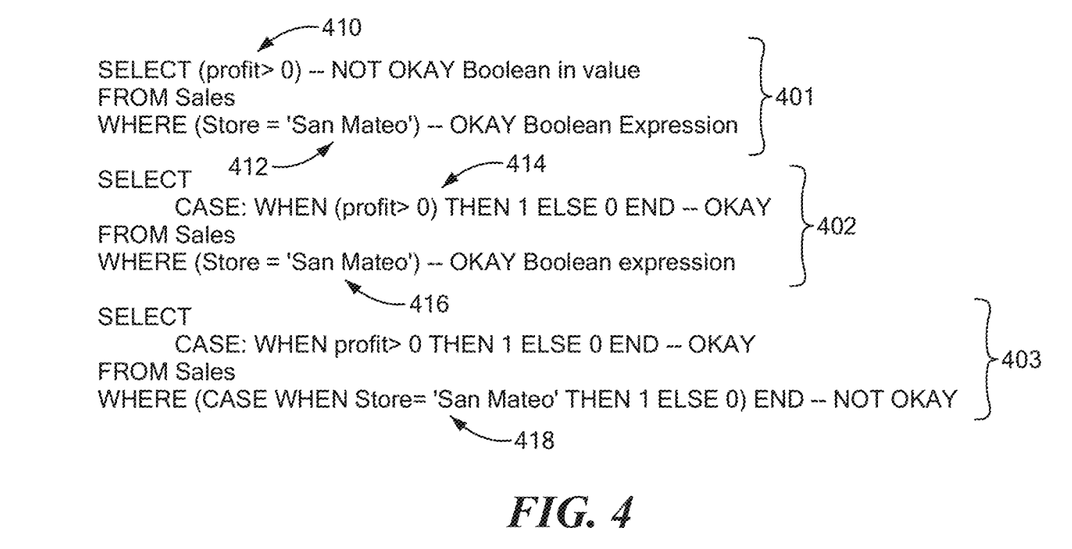
FIG. 4 shows a code fragment of unsupported types accommodated by the query engine of FIG. 3.

FIG. 4 shows a code fragment of unsupported types accommodated by the query engine of FIG. 3. Referring to the code segment in FIG. 4, several example SQL requests are shown. In interpreting the query request of lines 1-3, at fragment 401, it is first determined if the Boolean expression 410 occurs in a value context, as in line 1. The SELECT statement refers to a value or field to be returned, and thus is a value context because the object of the SELECT is another conditional statement calling out a value; in effect, a further selection. The query planner next determines if the query statement is directed to a database that disallows Boolean expressions in a value context, generally including older RDBMSs that expect an absolute field name, unencumbered by conditional expressions.

In fragment 402, conditional statement 414 is employed as a filter object of the WHEN, hence a conditional evaluation is required to determine selected records. WHERE object statement 416 is also a filter context, filtering only records pertinent to 'San Mateo.' Finally, fragment 403 include conditional statement 418, which looks similar to filter context statement 416, but being part of a CASE nested in a WHERE clause expecting a filter context expression will also be detected as an unrecognized value context.

Upon determining of the filter contexts and value contexts, query execution includes identifying Boolean expressions occurring in a filter context, and replacing the remaining Boolean expressions as value context based. The syntax 410 in conditional statement 401 performs a kind of "double duty" by allowing a selection condition to be applied to the values—a versatile capability, but which simply was not implemented in some older RDBMS engines. If such an expression is found, the query is modified to replace the identified Boolean expression with a sentinel value denoting a Boolean constant. Conditional statement 412 is in a context where a Boolean is needed to determine the outcome of whether to select the record in question, hence it is an acceptable Boolean expression.

It should be noted that the distinction between filter and value contexts is often one of semantic, not functional, capabilities. Often the outcome sought by value context expressions can be achieved by restating as a value based statement followed by a filter based statement. A filter context implies that the parser or interpreter was only expecting an evaluable Boolean expression or absolute field designation devoid of nesting of conditional statements. The syntax examples of FIG. 4 illustrate how such a context difference can be elusive in casual inspection.

Configurations herein therefore provide a mechanism by which Boolean values may be simulated in databases that do not support them. It relies on multi-pass transformations of a query plan, coupled with a final data transformation. In one approach, the tagging and transformation is done using an abstract syntax tree (AST that natively represents Boolean values wherever they are required. This syntax tree must support the tagging of values where they are wrapped with a virtual expression, and these must be reentrant, e.g., TaggedValue (TaggedValue ({size>3}, RequireInt), RequireBoolean). This process requires the nomination of two sentinel values to represent true and false. The sentinel type is the data type of these sentinel values. 1 and 0 would be a common choice.

In a particular approach, the query planner 102 determines if the Boolean expression occurs in a value context by tagging all filter contexts in the query statement, in which the filter context is defined by an expression evaluating to a Boolean value. It then tags all Boolean values including the tagged filter contexts for directing an integer value, such that the integer denotes a sentinel value for replacing an unrecognized Boolean expression. Double tagged occurrences now represent acceptable filter contexts, thus the query planner removes the Boolean values tagged for both a filter context and an integer value, and replaces the remaining tags for Boolean values with an integer typed equivalent, or sentinel value.

Figure 5:
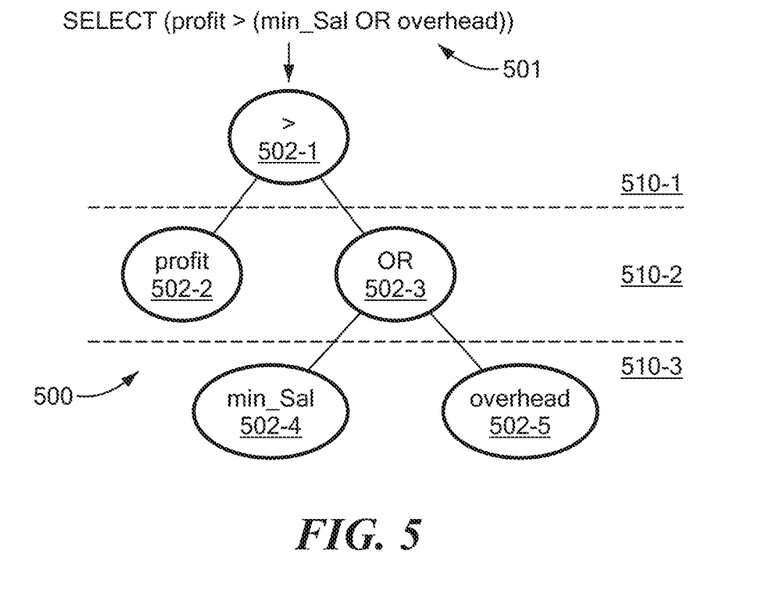
FIG. 5 shows a syntax tree for unsupported type substitution by the query engine of FIG. 3.

FIG. 5 shows a syntax tree, or parse tree, for unsupported type substitution by the query engine of FIG. 3. Referring to FIGS. 3-5, the hierarchical parse tree is based on the nesting of the conditional expressions in the query statement 130. The query planner 102 generates the parse tree 500 from the query statement 501. The parse tree 500 is defined by a hierarchical arrangement of query elements. The tree 500 denotes each element in a node having constituent query elements in a child node. From the parse tree, and for each expression, the transformation logic 150 determines if the Boolean expression occurs in a value context, and in a context free manner, based on the node containing the Boolean expression and child nodes of the Boolean expression. In this manner, the hierarchical expression of the parse tree 500 forms an Abstract Syntax Tree (AST).

In particular implementations, the query planner 102 parses and arranges the query request into a hierarchical tree denoting the query operations/commands and parameters/values that they operate on. Referring to FIGS. 3-5, a query statement 501 similar to line 1 is shown in an example parse tree arrangement. The query plan transformer 104 generates a parse tree 500 from the query statement 501, such that the parse tree 500 is defined by a hierarchical arrangement of query elements denoting each element in a node 502-1 . . . 502-N having constituent query elements in a child node. Child/parent nodes 502 define levels 510-1 . . . 510-N. The query plan transformer determines if the Boolean expression occurs in a value context in a context free manner based on the node containing the Boolean expression, and the child nodes of the Boolean expression. In other words, the inquiry for determining if a simulated Boolean value is needed is based on the current level and successive child levels, and need not examine higher parent levels.

In FIG. 5, the nested expression positioned as an operand to the SELECT statement shows nested operands as child nodes of the operator they are nested within. This compartmentalizes the child nodes so that queried values residing on those nodes may be attributed to the databases having the relevant values. The query plan transformer 102 approaches the query statement including the OR at level 510-2 and need only be concerned with nodes on that level and successive child levels, i.e. level 510-3 including the operands of the OR. In a particular configuration, the hierarchical tree (expression) is built as an Abstract Syntax Tree (AST), however alternate hierarchical representations may be employed. In many cases, the database in need of a simulated Boolean is a relational database absent a native Boolean type.

Having determined a Boolean value imposed on a Boolean non-conversant database, a simulated Boolean value is injected into the query syntax. Upon determining the existence of a Boolean expressions in a disallowed value context, the plan transformer 104 tags all filter contexts in the query statement where the filter context is defined by an expression evaluating to a Boolean value. It then tags all Boolean values including the tagged filter contexts for directing an integer value, such that the integer value denotes a sentinel value for replacing an unrecognized Boolean expression. For example, a TRUE might be designated by a 1 and a "FALSE" by a 0. This is followed by removing the Boolean values tagged for both a filter context and an integer value, leaving needed Boolean simulations remaining. Remaining tags are then replaced with an integer typed equivalent.

Figure 6:
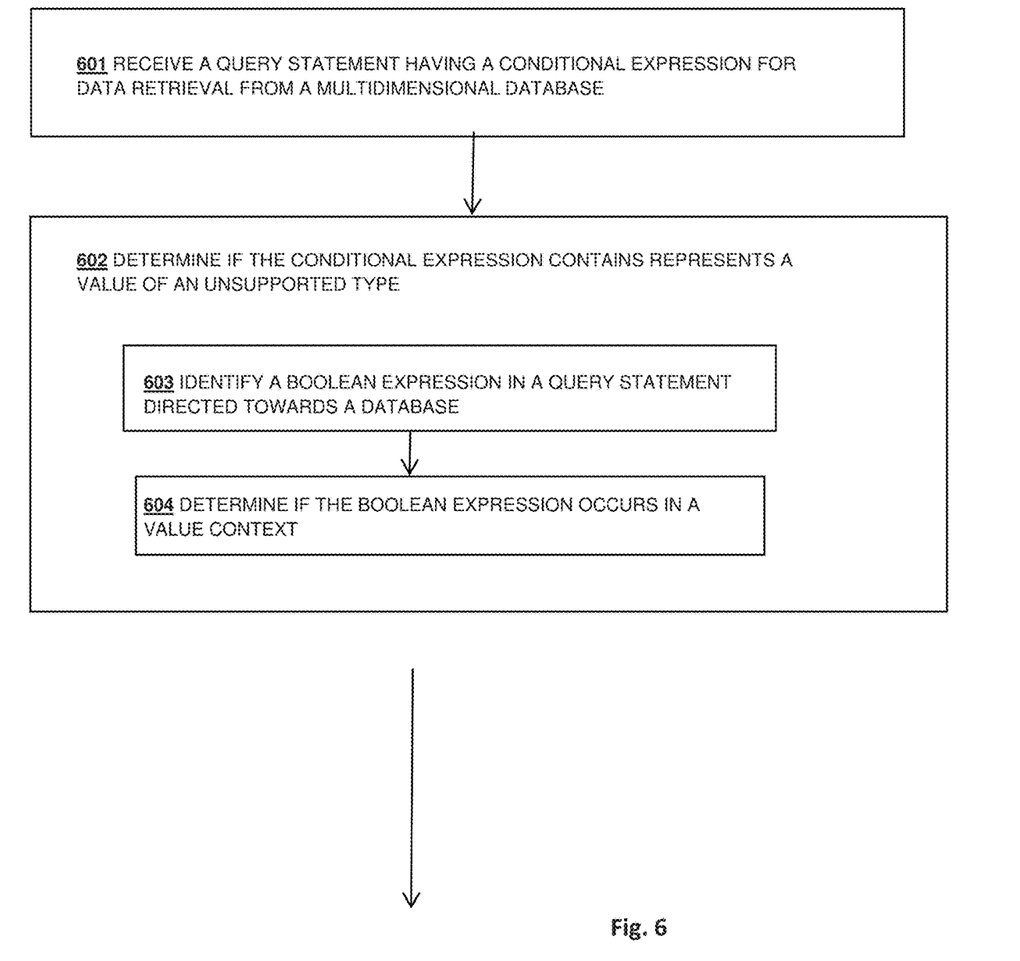
FIG. 6 is a flowchart of unsupported type substitution using the syntax tree of FIG. 5.

FIG. 6 is a flowchart 600 of unsupported type substitution using the syntax tree of FIG. 5. Referring to FIGS. 1-6, at step 601, the method of interpreting query syntax includes receiving a query statement 130 having a conditional expression for data retrieval from a multidimensional database 140, and determining if the conditional expression contains represents a value of an unsupported type, as depicted at step 602. In the example configuration herein, this includes identifying a Boolean expression in a query statement directed towards the database 140, as shown at step 603, and then determining if the Boolean expression occurs in a value context as depicted at step 604. Logical expressions such as English-like SQL statements often include conditional expressions that evaluate to "true" or "false" to define a filter context for selection of records for retrieval. These expressions can be nested and complex. Another usage is in a value context which allow a compact expression of a conditional where none is expected. This usage can violate syntax rules of older SQL interpreters.

In a particular example using Boolean values, transformation proceeds as follows:

1. Tag all the filter contexts, where the value must be Boolean, with a tag indicating to produce a Boolean value. This typically includes things like inside an OR or AND expression, or the WHERE clause of a SQL query.

2. Next, tag all Boolean values with a tag indicating to produce an integer value—including those inside an existing context tag.

3. Then, remove all double tags of the form Tag (Tag( . . . , RequireInt), eBoolean). Optionally, an implementation could avoid double tagging in step two, allowing it to skip step three. However, this requires a context-aware transformation, which may not always be available or desirable.

Accordingly, the query planner 102 invokes transformation logic 150 for transforming, based on the determination of an unsupported type, the unsupported value of the conditional expression to a value of a supported type, as depicted at step 605. Boolean types are used as an example, however other types may be employed. This includes determining if the query statement 130 is directed to a database that rejects Boolean expressions in a value context, and if so, replacing the identified Boolean expression with a sentinel value denoting a Boolean constant, as disclosed at step 606. This requires identifying Boolean expressions occurring in a filter contexts, and replacing the remaining Boolean expressions as value context based, as depicted at step 607. The logic 150 evaluates the query statement for the conditional expression defining an unsupported type, as shown at step 608, to determine where to substitute a supported type. The logic 150 identifies a sentinel value of a supported type that satisfies the conditional expression, as depicted at step 609, and replaces the conditional expression using the sentinel value, as disclosed at step 610. Boolean expressions can be replaced with 1 or 0, for True or False, respectively.

In the example above, therefore, substitution can proceed as follows to substitute tagged values for type conversions Sentinel-tagged Boolean values b can be converted to an expression Similar to "if (b) then 1 else 0."

Boolean tagged sentinel values v can be converted to an expression Similar to "v=1."

Literal Boolean values like true might be converted to constant expressions like 1=1 if required.

The substitution should retain information about the actual desired type for any returned results. This can be accomplished using further tagging or the retention of metadata out of band.

Having replaced the unsupported type with a supported syntax construct, the query executor 106 retrieves a query result responsive to the transformed query statement, as depicted at step 611. Having received the query result 138 based on the sentinel value, the returned result is augmented by identifying values in the query result 138 that are based on the transformed conditional expression, shown at step 612, and replacing values in the query results corresponding to the sentinel values with values based on the unsupported type from the query statement, as depicted at step 613. In the case of Boolean unsupported types, the replaced 1 and 0 values would be reversed to achieve an expected user result.

The query transformation system will allow any query to be represented in a logically isomorphic way within the target system, but the additional replacement step is required in the client to convert any sentinel values back to the native Boolean type.

This is accomplished as follows:

As results are read, inject a transformation into the process that can look at individual columns and values and manipulate them.

Based on the metadata stored from step four during query transformation, identify any columns where the desired type is of Boolean but a transformation to sentinel values was required.

Reverse the mapping from sentinel values to Boolean values. E.g., 1_true, 0_false.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as solid state drives (SSDs) and media, flash drives, floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions, including virtual machines and hypervisor controlled execution environments. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of interpreting query syntax, comprising:
receiving a query statement having a conditional expression for data retrieval from a multidimensional database;
identifying a Boolean expression in the query statement directed towards the multidimensional database by:
tagging Boolean expressions appearing in a filter context in the query statement, the query statement defined by SQL in a first pass; and
tagging all Boolean expressions irrespective of a filter context in a successive second pass;
determining that the conditional expression contains a value of an unsupported type based on the Boolean expression occurring in a value context based on whether the Boolean expression is double-tagged, where the query statement is directed to a database that rejects Boolean expressions in a value context;
removing the double-tagged Boolean expressions;
transforming, based on the determination of an unsupported type denoted by the remaining tagged Boolean Expressions, the unsupported value of the conditional expression to a value of a supported type by replacing the identified Boolean expression with a sentinel value denoting a Boolean constant.

2. The method of claim 1 further comprising evaluating the query statement for a conditional expression defining an unsupported type;
identifying a sentinel value of a supported type that satisfies the conditional expression; and
replacing the conditional expression using the sentinel value.

3. The method of claim 2 further comprising:
removing the Boolean values tagged for both a filter context and an integer value; and
replacing the remaining tags Boolean value with an integer typed equivalent.

4. The method of claim 1 wherein the database has a query syntax defining metadata and expressions recognized for querying the database, further comprising:
comparing the conditional expression to the query syntax of the database, and
determining that the conditional expression is not supported by the query syntax of the database; and
generating a transformed query statement including the conditional expression defining the supported type.

5. The method of claim 4 further comprising:
retrieving a query result responsive to the transformed query statement;
identifying values in the query result based on the transformed conditional expression; and
replacing values in the query results corresponding to the sentinel values with values based on the unsupported type from the query statement.

6. The method of claim 1 wherein the query statement includes filter contexts and value contexts, further comprising identifying Boolean expressions occurring in a filter contexts, and replacing the remaining Boolean expressions as value context based.

7. The method of claim 6 further comprising:
generating a parse tree from the query statement, the parse tree defined by a hierarchical arrangement of query elements denoting each element in a node having constituent query elements in a child node; and
determining if the Boolean expression occurs in a value context in a context free manner based on the node containing the Boolean expression and child nodes of the Boolean expression.

8. The method of claim 7 wherein the hierarchical expression is an Abstract Syntax Tree (AST).

9. The method of claim 1 wherein the database is a relational database absent a native Boolean type.

10. The method of claim 1 wherein determining the Boolean expressions in a value context further comprises:
tagging all filter contexts in the query statement, the filter context defined by an expression evaluating to a Boolean value; and
tagging all Boolean values including the tagged filter contexts for directing an integer value, the integer value denoting a sentinel value for replacing an unrecognized Boolean expression.

11. A computer device for receiving and interpreting query syntax, comprising:

an interface to a user application, the interface for receiving a query statement having a conditional expression for data retrieval from a multidimensional database;
a query planner for determining if the conditional expression contains represents a value of an unsupported type including a Boolean expression in the query statement directed towards the multidimensional database by:
tagging Boolean expressions appearing in a filter context in the query statement, the query statement defined by SQL in a first pass; and
tagging all Boolean expressions irrespective of a filter context in a successive second pass;
transformation logic for transforming, by removing the double-tagged Boolean expressions for a determination of an unsupported type, denoted by the remaining tagged Boolean expressions, from occurrence of the Boolean expression in a value context based on whether the Boolean expression is double-tagged, where the query statement is directed to a database that rejects Boolean expressions in a value context, the unsupported value of the conditional expression to a value of a supported type by replacing the identified Boolean expression with a sentinel value denoting a Boolean constant.

12. The device of claim 11 further comprising evaluating the query statement for a conditional expression defining an unsupported type;
identifying a sentinel value of a supported type that satisfies the conditional expression; and
replacing the conditional expression using the sentinel value.

13. The device of claim 11 wherein the database has a query syntax defining metadata and expressions recognized for querying the database, wherein the transformation logic is configured to:
compare the conditional expression to the query syntax of the database, and
determine that the conditional expression is not supported by the query syntax of the database; and
generate a transformed query statement including the conditional expression defining the supported type.

14. The device of claim 13 further comprising:
a result handler for retrieving a query result responsive to the transformed query statement;
the result handler for identifying values in the query result based on the transformed conditional expression, and replacing values in the query results corresponding to the sentinel values with values based on the unsupported type from the query statement.

15. The device of claim 11, wherein the transformation logic is further configured for
identifying a Boolean expression in a query statement directed towards a database;
determining if the Boolean expression occurs in a value context; and
determining if the query statement is directed to a database that rejects Boolean expressions in a value context, and if so, replacing the identified Boolean expression with a sentinel value denoting a Boolean constant.

16. The device of claim 15 wherein the query statement includes filter contexts and value contexts, further comprising identifying Boolean expressions occurring in a filter contexts, and replacing the remaining Boolean expressions as value context based.

17. The device of claim 15 further comprising:
a parse tree generated from the query statement, the parse tree defined by a hierarchical arrangement of query elements denoting each element in a node having constituent query elements in a child node, wherein the transformation logic determines if the Boolean expression occurs in a value context in a context free manner based on the node containing the Boolean expression and child nodes of the Boolean expression.

18. The device of claim 17 wherein the hierarchical expression is an Abstract Syntax Tree (AST).

19. A computer program embodying program code on a non-transitory medium that, when executed by a processor, performs steps for implementing a method for, in a datacube environment having a plurality of dimensions indicative of facts, interpreting query syntax, the method comprising:

receiving a query statement having a conditional expression for data retrieval from a multidimensional database;

identifying a Boolean expression in the query statement directed towards the multidimensional database by:

tagging Boolean expressions appearing in a filter context in the query statement, the query statement defined by SQL in a first pass; and tagging all Boolean expressions irrespective of a filter context in a successive second pass;

determining that if the conditional expression contains a value of an unsupported type based on the Boolean expression occurring in a value context based on whether the Boolean expression is double-tagged, where the query statement is directed to a database that rejects Boolean expressions in a value context;

removing the double-tagged Boolean Expressions; and determining if the query statement is directed to a database that rejects Boolean expressions in a value context denoted by the remaining tagged Boolean Expressions, and if so, replacing the identified Boolean expression with a sentinel value denoting a Boolean constant.

\* \* \* \* \*